(12) United States Patent
Lindmark et al.

(10) Patent No.: US 9,475,452 B2
(45) Date of Patent: Oct. 25, 2016

(54) HINGE ARRANGEMENT FOR A BONNET AND A BONNET ARRANGEMENT

(71) Applicant: VOLVO CAR CORPORATION, Gothenburg (SE)

(72) Inventors: Peter Lindmark, Hisings Backa (SE); Carin Stenmark, Vastra Frolunda (SE); Cihan Tekin, Hisings Backa (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/798,922

(22) Filed: Jul. 14, 2015

(65) Prior Publication Data

US 2016/0016533 A1 Jan. 21, 2016

(30) Foreign Application Priority Data

Jul. 21, 2014 (EP) .................................. 14177850

(51) Int. Cl.
*B60R 21/38* (2011.01)
*B62D 25/12* (2006.01)

(52) U.S. Cl.
CPC ............. *B60R 21/38* (2013.01); *B62D 25/12* (2013.01)

(58) Field of Classification Search
CPC .......... B60R 21/38; E05D 3/06; B62D 25/12
See application file for complete search history.

(56) References Cited

U.S. PATENT DOCUMENTS

| | | | | |
|---|---|---|---|---|
| 6,439,330 B1* | 8/2002 | Paye | ........................ | B60R 21/38 180/274 |
| 6,834,735 B2* | 12/2004 | Kim | ........................ | B60R 21/38 180/274 |
| 6,868,930 B2* | 3/2005 | Brogly | ................... | B62D 25/12 180/69.2 |
| 7,000,720 B2* | 2/2006 | Polz | ........................ | B60R 21/34 180/274 |
| 7,617,898 B2* | 11/2009 | Leong | ..................... | B60R 21/38 180/69.2 |
| 2005/0257980 A1* | 11/2005 | Green | ................... | B62D 25/12 180/274 |
| 2006/0131086 A1* | 6/2006 | Lutter | .................... | B60R 21/34 180/69.21 |
| 2007/0062748 A1* | 3/2007 | Erwin | ..................... | B60R 21/38 180/69.21 |
| 2009/0050388 A1 | 2/2009 | Leong | | |
| 2014/0132036 A1* | 5/2014 | Fritzon | ............... | B62D 25/105 296/193.11 |

FOREIGN PATENT DOCUMENTS

DE 10152621 A1 5/2003
EP 1604874 A1 12/2005

(Continued)

OTHER PUBLICATIONS

Extended European Search Report Dated Sep. 30, 2014, Application No. 14177850.6-1503, Applicant Volvo Car Corporation, 6 Pages.

*Primary Examiner* — Drew Brown
(74) *Attorney, Agent, or Firm* — Brooks Kushman P.C.

(57) ABSTRACT

A hinge arrangement for a bonnet of a vehicle comprises a hinge portion adapted to be attached to a body of the vehicle, a bonnet portion adapted to be attached to the bonnet, and a rear deployment guiding element adapted to control transition of the hinge arrangement between a normal position and a deployed position. The hinge portion comprises one or more hinge pivot axes providing a hinged connection between the bonnet and the body of the vehicle allowing opening of the bonnet. The bonnet portion is arranged to be in a fixed position relative to an upper portion of the hinge portion during opening of the bonnet. The bonnet portion as a whole is arranged to be translationally displaced at least upwards in relation to the upper portion of the hinge portion during a transition of the hinge arrangement between the normal position and the deployed position.

21 Claims, 5 Drawing Sheets

(56) References Cited

FOREIGN PATENT DOCUMENTS

| EP | 2380787 | A1 | 10/2011 |
|----|---------|----|---------|
| EP | 2733024 | A1 | 5/2014 |
| JP | 2005059799 | A | 3/2005 |
| JP | 2007245937 | A | 9/2007 |
| JP | 2009083604 | A | 4/2009 |

* cited by examiner

HINGE ARRANGEMENT FOR A BONNET AND A BONNET ARRANGEMENT

CROSS-REFERENCE TO RELATED APPLICATIONS

This application claims foreign priority benefits under 35 U.S.C. §119(a)-(d) to European patent application number EP 14177850.6, filed Jul. 21, 2014, which is incorporated by reference in its entirety.

TECHNICAL FIELD

The present disclosure relates to a hinge arrangement for a bonnet of a vehicle. The disclosure further relates to a bonnet arrangement comprising such a hinge arrangement.

BACKGROUND

If a motor vehicle, such as a car, is involved in an accident in which the front part of the vehicle hits a vulnerable road user, such as a pedestrian or a cyclist, it is not uncommon that the head of the vulnerable road user impacts on the bonnet of the vehicle. The vulnerable road user may in that case be severely injured. One parameter, which can affect the severity of the injury, is the fact that the bonnet, which is usually formed from a thin metal sheet, would tend to bend, and then deform on hard engine parts, such as an engine block, located in an engine compartment beneath the bonnet. In order to reduce the severity of these accidents, it is well-known to use a deployable bonnet. By raising at least the rear part of the deployable bonnet to a deployed position, also called a pop-up position, the distance between the bonnet and the hard engine parts is increased, and thereby the consequences of such an impact are mitigated.

The bonnet is in American English known as a hood, but herein the British English term bonnet is used.

Document DE 101 52 621 A1 discloses a bonnet arrangement including a bonnet with at least one rear hinge arrangement attached to the bonnet and to a body of the vehicle. In a collision with a vulnerable road user, the bonnet is raised at the rear end portion. The front region of the bonnet is thereby forcibly raised by means of a mechanical coupling. There-fore, in the deployed position, the bonnet is raised both at the front and rear end portions.

The hinge arrangement according to DE 101 52 621 A1 comprises a two-hinged configuration. When the bonnet is opened to permit access to the engine compartment for service, maintenance and/or repair, the bonnet is pivoted around two pivot axes, first around a first pivot axis providing pivoting in relation to a body of the vehicle and then at a second pivot axis providing pivoting in relation to the bonnet of the vehicle.

Further, according to DE 101 52 621 A1, the front end portion of the bonnet is moved to the deployed position before it is possible to open the bonnet in a normal way in order to permit access to the engine compartment for service, maintenance and repair. Therefore, according to DE 101 52 621 A1, there is no need for a latch and striker mechanism retaining the bonnet in the closed position.

In the bonnet arrangement according to DE 101 52 621 A1 the bonnet is displaced from the closed position to the open position via the deployed position. Likewise, the bonnet is displaced back from the open position via the deployed position to the closed position. It is thus not possible to displace the bonnet directly from the closed to the open position, making the normal opening of the bonnet somewhat cumbersome.

Patent document EP 2380787 A1 discloses a hinge arrangement for a bonnet of a vehicle. The hinge arrangement comprises a first hinge member, connectable to the bonnet, a second hinge member having a first end and a second end, and a third hinge member connectable to the body structure. The first end of the second hinge member is connected to the first hinge member, and the opposite end of the second hinge member, i.e., the second end, is pivotally connected to the third hinge member. Further, the first hinge member and the second hinge member are releasably engaged to each other by an engaging means. The engaging means is adapted to keep the first and second hinge member together when the bonnet is in the closed position or the open position, or when being displaced between these positions. When the bonnet is moved upwards in order to reach the deployed position, the engaging means is released and the first hinge member can move pivotally relative to the second hinge member at its first end, for example by means of a pivot pin. The engaging means may be a shear screw. Hence the first hinge member is pivoted in relation to the second hinge member to reach the deployed position.

SUMMARY

An object of the present disclosure is to overcome or ameliorate at least one of the disadvantages of the prior art, or to provide a useful alternative.

Thus, in a first aspect of the present disclosure there is provided a hinge arrangement adapted to be located at a rear end portion of a bonnet of a vehicle. The bonnet is displaceable between a closed position and a deployed position located at least upwards as compared to the closed position. The hinge arrangement is transitable between a normal position, corresponding to the bonnet being in the closed position, and a deployed position, corresponding to the bonnet being in the deployed position. The hinge arrangement comprises a hinge portion adapted to be attached, directly or indirectly, to a body of the vehicle, a bonnet portion adapted to be attached, directly or indirectly, to the bonnet, and a rear deployment guiding element adapted to control the transition of the hinge arrangement between the normal position and the deployed position. The hinge portion comprises one or more hinge pivot axes providing a hinged connection between the bonnet and the body of the vehicle allowing opening of the bonnet. The hinge portion comprises an upper portion being more distal to the body than the hinged connection. The bonnet portion is arranged to be in a fixed position relative to the upper portion of the hinge portion during opening of the bonnet. The bonnet portion as a whole is arranged to be translationally displaced at least upwards in relation to the upper portion of the hinge portion during a transition of the hinge arrangement between the normal position and the deployed position, the transition being controlled by the rear deployment guiding element.

With a hinge arrangement as disclosed herein it is possible to decouple the movements occurring within the hinge arrangement during normal opening of the bonnet and the movements occurring within the hinge arrangement during the transition of the hinge arrangement from the normal position to the deployed position from each other.

This differs from prior art hinge arrangements. For example, according to the hinge arrangement of EP 2380787 A1, both pivot axes are active when displacing the bonnet from the closed position to the deployed position. Further, according to the hinge arrangement of DE 101 52 621 A1, both pivot axes are involved when displacing the bonnet from the closed position to the open position.

The closed position of the bonnet is the normal position of the bonnet, which for example is used when driving the vehicle or parking the vehicle. The bonnet then covers the engine compartment.

The deployed position of the bonnet is located at least upwards as compared to the closed position. Preferably the deployed position is located upwards and rearwards as compared to the closed position, but it would also be possible to have a deployed position being straight upwards as compared to the closed position, or upwards and forwards. The directions, i.e., upwards, rearwards and forwards, are defined in relation to the body of the vehicle, assuming it is standing on a horizontal ground. The bonnet is preferably arranged such that when displacing it from the closed position to the deployed position, the bonnet moves simultaneously upwards and rearwards in a combined movement.

The bonnet arrangement may be arranged such that the deployed position of the bonnet permits partial access to the engine compartment, e.g., for filling a vehicular liquid, such as a washer fluid or a coolant. Thereby there is no need to open the bonnet to the open position for such tasks.

By raising the rear end portion of the bonnet to the deployed position at least upwards, preferably upwards and rearwards, the distance between the bonnet and the hard engine parts is increased, thereby reducing the severity of an accident involving a vulnerable road user impacting on the bonnet. However, the bonnet arrangement of the disclosure may in addition also raise the front end portion of the bonnet at least upwards, preferably upwards and rearwards, and in that case the whole bonnet is raised when in the deployed position. The bonnet is then moved as a whole, although the actual displacements, e.g., given in millimeters, at the two end portions may differ. This may be advantageous in case the vulnerable road user hits the front portion of the bonnet, e.g., if the vulnerable road user is short, such as a child.

The bonnet may also assume an open position. The open position permits access to the engine compartment of the vehicle e.g., for service, maintenance or repair work. In order to reach the open position, the bonnet is pivoted around the hinged connection with one or more hinge pivot axis/axes extending substantially in a lateral direction of the vehicle at or adjacent to the rear end portion of the bonnet. The open position of the bonnet of the bonnet arrangement as described herein can be reached without passing the deployed position.

The hinge portion of the hinge arrangement provides the hinged connection allowing opening of the bonnet, e.g., to the open position. The hinge portion may comprise a single hinge pivot axis, but it would also be feasible with a multi-link hinged connection comprising a plurality of pivot axes.

The term "more distal" is used herein to denote that the upper portion is situated further away from the point of attachment of the hinge arrangement to the body than the hinged connection, i.e., the upper portion is connected via the hinged connection and possibly other components to the body of the vehicle.

The bonnet portion as a whole is arranged to be translationally displaced at least upwards in relation to the upper portion of the hinge portion during the transition of the hinge arrangement between the normal position and the deployed position. Preferably the bonnet portion is translationally displaced upwards and rearwards, but it is would also be possible to displace it straight upwards, or upwards and forwards. Hence the bonnet portion is not pivoted like the first hinge member attachable to the bonnet in the hinge arrangement of EP 2380787 A1. The transition of the hinge arrangement as disclosed herein is controlled by the rear deployment guiding element, e.g., the rear deployment guiding element is adapted to guide the movement of the bonnet portion in relation to the hinge portion, in particular in relation to its upper portion. In the hinge arrangement of EP 2380787 A1 the transition of the hinge arrangement is controlled by the rotations at the pivot axes and there is no rear deployment guiding element.

The rear deployment guiding element may be directly or indirectly connected to the bonnet portion and to the upper portion of the hinge portion. The rear deployment guiding element may comprise an arm, having a first end pivotally connected to the bonnet portion, e.g., at a second pivot axis, and a second end pivotally connected to the upper portion, e.g., at a third pivot axis. In that case, the arm of the rear deployment guiding element is configured to pivot at the second and third pivot axes to provide the translational displacement of the bonnet portion in relation to the upper portion.

The hinge portion may comprise a first locking unit, having a locked state and an open state and being adapted to lock the upper portion of the hinge portion in relation to a lower portion of the hinge portion. The lower portion is more proximal to the body of the vehicle than the hinged connection. In the open state, the first locking unit allows opening of the bonnet, and in the locked state the first locking unit locks the upper portion of the hinge portion in relation to the lower portion of the hinge portion, i.e., their positions in relation to each other are fixed.

The locked state of the first locking unit is utilized during the transition of the hinge arrangement between its normal position and its deployed position. During this transition the hinged connection is inactive, i.e., there is no pivotal movement in the hinge portion. The open state is utilized during normal opening of the bonnet.

The term "more proximal" is used herein to denote that the lower portion is situated closer to the point of attachment of the hinge arrangement to the body than the hinged connection. Hence the term proximal is the opposite of the term distal.

The first locking unit may comprise a hook and a catch. The hook may be tensioned, e.g., by a spring, such that it is biased to the locked state. In the open state, the spring is tensioned such that the hook moves out of grip. The upper portion is then displaceable in relation to the lower portion by means of the hinged connection, thus allowing normal opening of the bonnet. The hook may be located at the lower portion and the catch at the upper portion, but they may also be located in the opposite way. A portion of the upper portion, or the lower portion if applicable, may be utilized as the catch.

Other kinds of first locking units are feasible, such as a spring-loaded pin attached to one of the upper portion or the lower portion and going through an opening in the other of the upper portion or the lower portion, which pin may be pulled out from the opening to assume the open state allowing pivotal movement at the hinged connection between the upper portion and the lower portion.

The hinge arrangement may comprise a second locking unit, having a locked state and an open state and being adapted to lock the bonnet portion in relation to the upper portion of the hinge portion. In the locked state, the second locking unit locks the bonnet portion in relation to the upper portion of the hinge portion. In the open state, the second locking unit allows the translational displacement at least upwards, preferably upwards and rearwards, of the bonnet portion.

The second locking unit is in its locked state during normal opening of the bonnet. Further, the second locking unit is in its open state during the transition of the hinge arrangement between its normal position and its deployed position.

The second locking unit may comprise a hook and a catch. The hook may be tensioned, e.g., by a spring, such that it is biased to the locked state. In the open state, the spring is tensioned such that the hook moves out of grip. The bonnet portion is then displaceable in relation to the upper portion, thus allowing the transition of the hinge arrangement between its normal position and its deployed position. The hook may be located at the bonnet portion and the catch at the upper portion, but they may also be located in the opposite way. A portion of the upper portion, or the bonnet portion if applicable, may be utilized as the catch.

Other kinds of second locking units are feasible, such as a spring-loaded pin attached to one of the bonnet portion or the upper portion and going through an opening in the other of the bonnet portion or the upper portion, which pin may be pulled out from the opening to assume the open state allowing pivotal movement at the hinged connection between the bonnet portion and the upper portion.

The hinge arrangement may comprise a lifting member adapted to directly or indirectly operate on the bonnet portion, thereby providing the translational displacement at least upwards, preferably upwards and rearwards, of the bonnet portion during the transition of the hinge arrangement between the normal position and the deployed position.

The lifting member may be a piston released by pyrotechnics. The bonnet portion may comprise an abutment adapted for the lifting member to push on, e.g., by having an abutment surface perpendicular to the axial direction of the piston.

The lifting member may be adapted to operate on the second locking unit, such that the second locking unit is changed from its locked state to its open state by the lifting member. The lifting member may e.g., push the bonnet portion via pushing on the second locking unit.

For the above-mentioned embodiment, wherein the rear deployment guiding element comprises an arm having a first end pivotally connected to the bonnet portion, e.g., at a second pivot axis, and a second end pivotally connected to the upper portion, e.g., at a third pivot axis, the hook may be pivotable around one of the second or third pivot axes in order to change its state between its closed and its open state.

In a second aspect of the present disclosure, there is provided a bonnet arrangement for a vehicle, the bonnet arrangement comprising a bonnet being displaceable between a closed position and a deployed position located at least upwards, preferably upwards and rearwards, as compared to the closed position, and a hinge arrangement as disclosed herein.

The bonnet arrangement may comprise a striker and a latch. One of the striker or the latch is adapted to be attached at the front end portion of the bonnet, and the other of the striker or the latch is adapted to be attached to the body of the vehicle at a position permitting cooperation between the striker and the latch. The striker comprises a front deployment guiding element being adapted to guide the latch during the displacement of the bonnet from the closed position to the deployed position, such that the displacements at least upwards, preferably upwards and rearwards, of the bonnet to its deployed position correspond at the front end portion and at the rear end portion of the bonnet.

The striker or latch adapted to be fastened at the front end portion of the bonnet is displaced at least upwards, preferably upwards and rearwards, in relation to the other of the striker or latch during the displacement of the bonnet from the closed position to the deployed position. For example, if the striker is attached to the bonnet and the latch to the body of the vehicle, the striker is displaced at least upwards, preferably upwards and rearwards, in relation to the latch, when the bonnet is deployed. Vice versa, if the latch is attached to the bonnet and the striker to the body of the vehicle, the latch is displaced at least upwards, preferably upwards and rearwards, in relation to the striker, when the bonnet is deployed.

Corresponding displacements at the front end portion and at the rear end portion result in that the bonnet is moved as a whole, although the actual displacements, e.g., given in millimeters, at the two end portions may differ, since the bonnet may also be somewhat tilted at the front or rear end portion.

One pair of striker and latch may be used. In that case, one of them is preferably located at or adjacent to the center of the front end portion of the bonnet, and the other at the corresponding location of the body of the vehicle. Alternatively, two, three or more pairs of striker and latch may be used. Often, there is one pair of a striker and a latch at or adjacent to each lateral side of the front end portion of the bonnet. The striker may be fastened at the front end portion of the bonnet and the latch may be fastened to the body of the vehicle, or vice versa.

Preferably, the striker and the latch may be moved back again relative to each other, when the bonnet is displaced back from the deployed position to the closed position. Thereby the positions of the striker and the latch relative to each other may be reset after a collision involving a vulnerable road user. Further, in the case the bonnet has been displaced to the deployed position in order to gain partial access to the engine compartment, as described above, it is preferred that the striker and the latch are displaceable back and forth relative to each other as many times as desired.

The bonnet arrangement may be arranged such that the latch has a locked state and an unlocked state. The unlocked state permits the bonnet to be opened to the open position permitting access to the engine compartment of the vehicle. Purely as an example, the latch may comprise a pin, which in the locked state is protruding, such that it goes through the striker, thereby retaining the striker, resulting in that the bonnet is locked and cannot be opened. In the unlocked state, the pin is refracted and thereby moved out of the striker, resulting in that the bonnet is unlocked and may be displaced to the open position. Alter-natively, the latch may comprise a latch portion, which is rotated out of the way, to thereby permit the striker to be removed from the latch. The latch normally is in its locked state. The latch is then set to the unlocked state, when the bonnet is to be opened. Therefore, the latch normally is in its locked state, when the bonnet is in its closed position, as well as when it is in its deployed position, and also during displacement between these two positions.

The front deployment guiding element has a straight or curved shape, which is generally angled in relation to a horizontal plane of the vehicle and also generally angled in relation to a vertical plane of the vehicle.

The striker may comprise a shaped rod. By a shaped rod, as used herein, is implied a rod which has been bent or formed in one or more locations along its length, e.g., to form a loop.

A deployment guiding portion of the shaped rod may form the front deployment guiding element. The latch is adapted to in a closed state move along the deployment guiding portion when the bonnet is displaced from its closed position to its deployed position.

The striker may comprise an aperture with a closed circumference, when seen from a lateral side of the vehicle. A part of the closed circumference may be constituted by the shaped rod and another part of the closed circumference may be constituted by a portion of the bonnet or a reinforcing structure being attached to the bonnet. At least a portion of the latch is then displaced within the closed circumference during displacement of the bonnet from the closed position to the deployed position.

The deployment guiding portion may have an angle $\alpha$, when seen from a lateral side of the vehicle, the angle $\alpha$ being from 20 to 70 degrees, preferably from 30 to 60 degrees, and most preferably from 40 to 50 degrees, to a horizontal plane of the vehicle, assuming the vehicle stands on a horizontal ground.

If the deployment guiding portion has a curved shape, the angle $\alpha$ is defined by a straight line going through the end positions of the latch in relation to the front deployment guiding element, which end positions correspond to a closed bonnet and to a deployed bonnet.

As an alternative to a shaped rod, the striker may comprise a slot, the latch being adapted to be displaced within the slot, the slot forming the front deployment guiding element. In that case the slot would be selected to extend at the angle $\alpha$ of from 20 to 70 degrees, preferably from 30 to 60 degrees, and most preferably from 40 to 50 degrees, in relation to the horizontal plane of the vehicle.

The latch may assume an angle $\beta$ to the front deployment guiding element, when seen from a lateral side of the vehicle. The angle $\beta$ is determined between a length direction L1 of the latch and the deployment guiding portion. The angle $\beta$ may be in the range of 80-100 degrees, preferably in the range of 85-95 degrees, more preferably the angle $\beta$ being right or substantially right. Thereby the latch may easily follow the front deployment guiding element.

The shape of the front deployment guiding element is preferably chosen to cooperate with the rear deployment guiding element, such that the bonnet is deployed in an appropriate way as a whole, although the actual displacements, e.g., given in millimeters, at the two end portions may differ, since the bonnet may also be somewhat tilted at the front or rear end portion.

The striker may comprise a front end portion having a length direction $L_2$. The length directions $L_1$ of the latch and $L_2$ of the front end portion of the striker may then be within 20 degrees from each other, preferably within 10 degrees from each other, and more preferably the length directions may be parallel or substantially parallel. This configuration has been found to be advantageous during an early phase of displacing the bonnet to the deployed position.

The striker may be configured such that at least a portion of it is attached to the bonnet in front of the latch. The front end portion of the striker may be attached to the bonnet in front of the latch. The front end portion of the striker may be attached to the bonnet in front of a point, in which the length direction $L_1$ of the latch intersects with the bonnet. The shortest distance between that point and the front end portion is denoted by d and should preferably be positive, i.e., the front end portion being in front of the point, preferably d being in the range of $0 < d \leq 100$ mm, more preferably $10 \text{ mm} \leq d \leq 80$ mm, and most preferably $20 \text{ mm} \leq d \leq 50$ mm. This configuration has been found to be advantageous during an early phase of displacing the bonnet to the deployed position.

The shaped rod may comprise a lower corner, where the shaped rod forms an angle $\gamma$, which angle $\gamma$ is chosen such that the latch is prevented from passing the lower corner. The angle $\gamma$ is preferably in the range of 70-110 degrees, more preferably in the range of 85-95 degrees.

The bonnet may comprise an inner panel and an outer panel. In that case the bonnet may comprise a reinforcement between the inner and outer panel at a location corresponding to the location of the striker or latch adapted to be fastened at the front end portion of the bonnet.

The front end portion of the bonnet may be adapted to be displaced rearwards by a longitudinal distance $d_{xf}$ being in the range of $0 < d_{xf} \leq 50$ mm, preferably $10 \text{ mm} \leq d_{xf} \leq 30$ mm in relation to the body of the vehicle during the displacement from the closed position to the deployed position. Further, the front end portion may be adapted to be displaced upwards by a vertical distance $d_{zf}$ being in the range of $0 < d_{zf} \leq 80$ mm, preferably $20 \text{ mm} \leq d_{zf} \leq 40$ mm in relation to the body of the vehicle during the displacement from the closed position to the deployed position. The distances $d_{xf}$ and $d_{zf}$ are determined at the location where the striker is attached to the bonnet.

The rear end portion of the bonnet may be adapted to be displaced rearwards by a longitudinal distance $d_{xr}$ being in the range of $0 < d_{xr} \leq 70$ mm, preferably $10 \text{ mm} \leq d_{xr} \leq 40$ mm in relation to the body of the vehicle during the displacement from the closed position to the deployed position. Further, the rear end portion may be adapted to be displaced upwards by a vertical distance $d_{zr}$ being in the range of $0 < d_{zr} \leq 150$ mm, preferably $50 \text{ mm} \leq d_{zr} \leq 100$ mm in relation to the body of the vehicle during the displacement from the closed position to the deployed position. The distances $d_{xr}$ and $d_{zr}$ are determined at the location where the hinge arrangement is attached to the bonnet.

Thereby, it is possible to provide a large enough gap in the deployed position between the bonnet and any hard engine parts. Further, in the case of providing partial access to the engine compartment, there will be enough room to fill the vehicular liquid.

It is to be understood that the hinge arrangement as disclosed herein may be used together with another latch and another striker as known from prior art. Further, the latch and the striker as disclosed herein may be utilized with a hinge arrangement known from prior art.

In a third aspect of the present disclosure, there is provided a vehicle comprising a bonnet arrangement according to any one of the preceding claims.

BRIEF DESCRIPTION OF THE DRAWINGS

The present disclosure will hereinafter be further explained by means of non-limiting examples with reference to the appended drawings, wherein.

It should be noted that the appended drawings are not necessarily drawn to scale and that the dimensions of some features of the present disclosure may have been exaggerated for the sake of clarity.

DETAILED DESCRIPTION

The disclosure will, in the following, be exemplified by embodiments. It should however be realized that the embodiments are included in order to explain principles of the disclosure and not to limit the scope of the disclosure, as defined by the appended claims. Details from two or more of the embodiments may be combined with each other.

Figure 1:
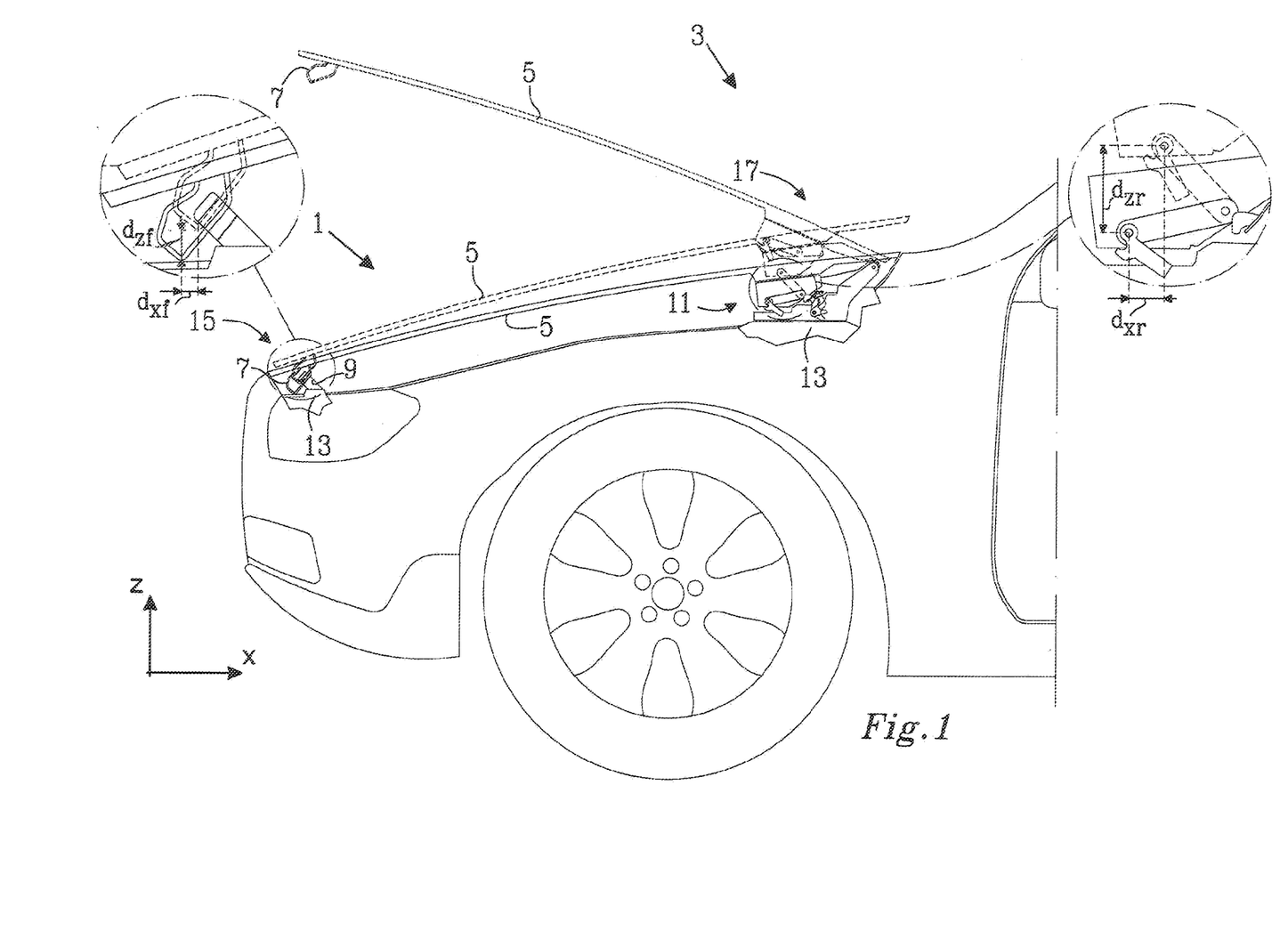
FIG. 1 is a schematic side view of a bonnet arrangement according to the disclosure, showing a bonnet in a closed, an open and a deployed position, respectively.

FIG. 1 schematically illustrates a bonnet arrangement 1 of a vehicle 3 according to the disclosure. The vehicle in this case is a car 3. The bonnet arrangement 1 comprises a bonnet 5, a striker 7, a latch 9 and a hinge arrangement 11. The bonnet 5 is connected to a body 13 of the vehicle 3 by the striker 7 and the latch 9 at a front end portion 15 of the bonnet 5, and by the hinge arrangement 11 at a rear end portion 17 of the bonnet 5. The hinge arrangement 11 will be further described below in conjunction with FIGS. 2-4. The striker 7 and the latch 9 will be further described below in conjunction with FIGS. 5-6.

The bonnet 5 is shown in a closed position, see continuous line, in a deployed position, see dashed line, and in an open position, see dotted line.

The closed position of the bonnet 5 is used during normal driving of the vehicle 3 and during parking of the vehicle 3.

The open position of the bonnet 5, as indicated by the dotted line in FIG. 1, permits access to the engine compartment, e.g., for service, maintenance or repair work. In order to reach the open position, the bonnet 5 is pivoted at or adjacent to its rear end portion 17 by means of the hinge arrangement 11. The bonnet 5 is then displaced directly from the closed position to the open position without passing the deployed position. When closing the bonnet 5 again from the open position, the opening displacement may be reversed.

The bonnet 5 is also displaceable from the closed position to the deployed position. As already mentioned above in the background section, it is well-known to use a deployable bonnet in a vehicle. By raising the rear end portion 17 of the bonnet 5 to a deployed position, also called a pop-up position, the distance between the bonnet 5 and any hard engine parts is increased, thereby reducing the severity of an accident involving a vulnerable road user being thrown onto the bonnet. However, in addition, the bonnet arrangement 1 of the disclosure also raises the front end portion 15 of the bonnet 5. This may be advantageous if the vulnerable road user hits the front portion of the bonnet 5, which e.g., may be the case, if the vulnerable road user is short, e.g., a child.

When being displaced from its closed position to its deployed position, the bonnet 5 moves simultaneously upwards in the z-direction and rearwards in the x-direction. Not only the rear end portion 17, but also the front end portion 15, is displaced upwards and rearwards. Preferably, the bonnet 5 is also displaceable from the deployed position back to the closed position, such that the bonnet arrangement 1 may be restored to the closed position after the deployed position has been activated.

The front end portion 15 of the bonnet 5 is adapted to be displaced rearwards by a longitudinal distance $d_{xf}$ being in the range of $0 < d_{xf} \leq 50$ mm, preferably $10 \text{ mm} \leq d_{xf} \leq 30$ mm in relation to the body 13 of the vehicle 3 during the displacement from the closed position to the deployed position. Further, the front end portion 15 is adapted to be displaced upwards by a vertical distance $d_{zf}$ being in the range of $0 < d_{zf} \leq 80$ mm, preferably $20 \text{ mm} \leq d_{zf} \leq 40$ mm in relation to the body 13 of the vehicle 3 during the displacement from the closed position to the deployed position. The distances $d_{xf}$ and $d_{zf}$ are determined at the location where the striker 7 is attached to the bonnet 5.

The rear end portion 17 of the bonnet 5 is adapted to be displaced rearwards by a longitudinal distance $d_{xr}$ being in the range of $0 < d_{xr} \leq 70$ mm, preferably $10 \text{ mm} \leq d_{xr} \leq 40$ mm in relation to the body 13 of the vehicle 3 during the displacement from the closed position to the deployed position. Further, the rear end portion 17 is adapted to be displaced upwards by a vertical distance $d_{zr}$ being in the range of $0 < d_{zr} \leq 150$ mm, preferably $50 \text{ mm} \leq d_{zr} \leq 100$ mm in relation to the body 13 of the vehicle 3 during the displacement from the closed position to the deployed position. The distances $d_{xr}$ and $d_{zr}$ are determined at the location where the hinge arrangement 11 is attached to the bonnet 5.

When the bonnet 5 is in the deployed position, there is partial access to the engine compartment. Thereby it is possible to e.g., fill vehicular liquids, such as a washer fluid or a coolant, without having to open the bonnet 5 to the open position.

One pair of a striker 7 and a latch 9 may be used. In that case, the pair is preferably located at or adjacent to the center of the front end portion 15 of the bonnet 5. Often, there is one pair of a striker 7 and a latch 9 at or adjacent to each lateral side of the front end portion 15 of the bonnet 5.

Usually, there is one hinge arrangement 11 at or adjacent to each lateral side of the rear end portion 17 of the bonnet 5. However, one, two, three or more hinge arrangements may be used.

In the embodiment of FIG. 1, the striker 7 is attached to the bonnet 5, while the latch 9 is attached to the body 13 of the vehicle 3. As an alternative, not illustrated, the striker 7 may be attached to the body 13 of the vehicle 3 and the latch 9 to the bonnet 5. In any case, the striker 7 and the latch 9 are located such that they can cooperate with each other, when the bonnet 5 is in the closed position and the deployed position, respectively.

Figure 2:
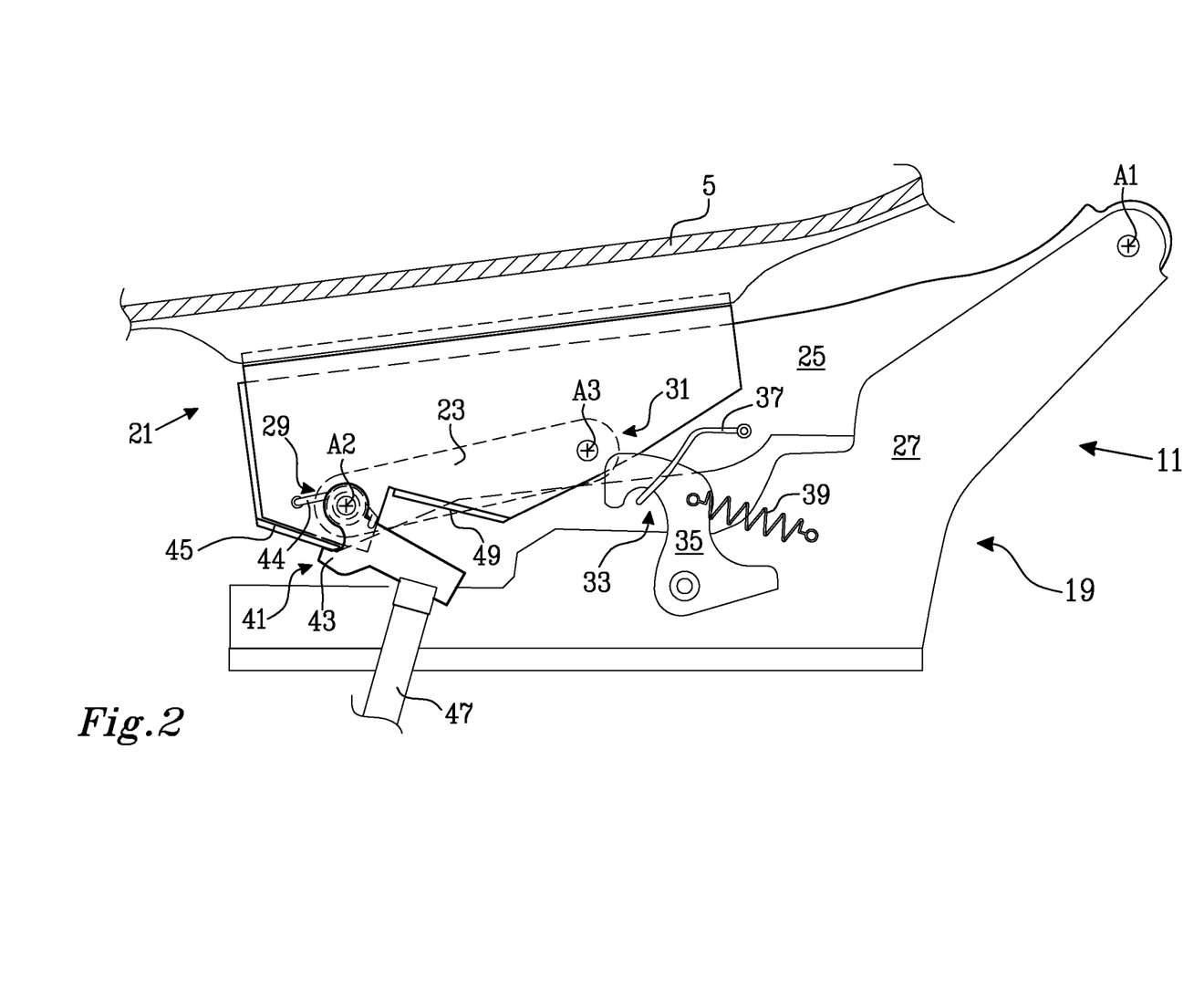
FIG. 2 illustrates a hinge arrangement of the bonnet arrangement of FIG. 1 in a normal position.
Figure 3:
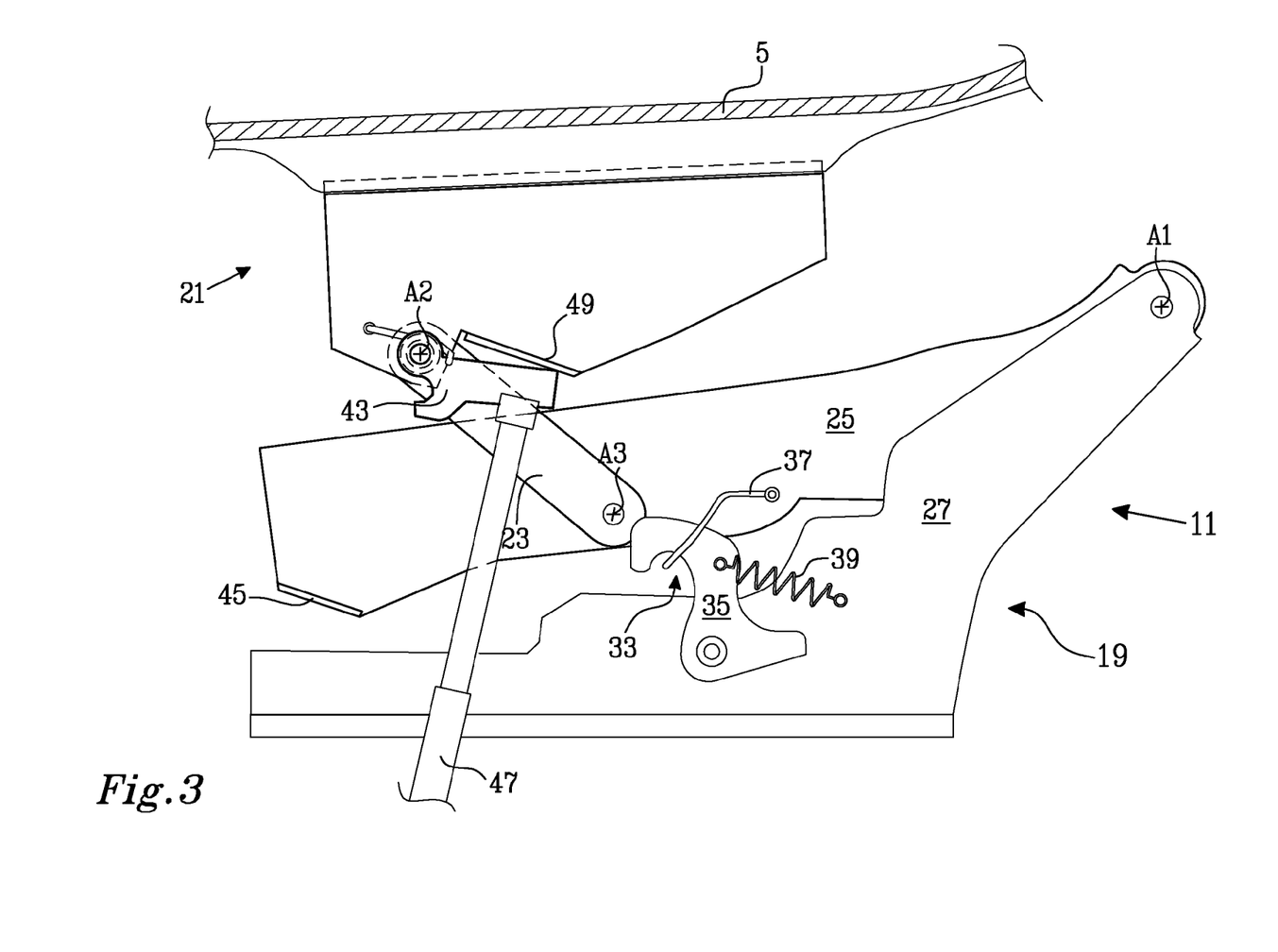
FIG. 3 illustrates the hinge arrangement of FIG. 2 in a deployed position.
Figure 4:
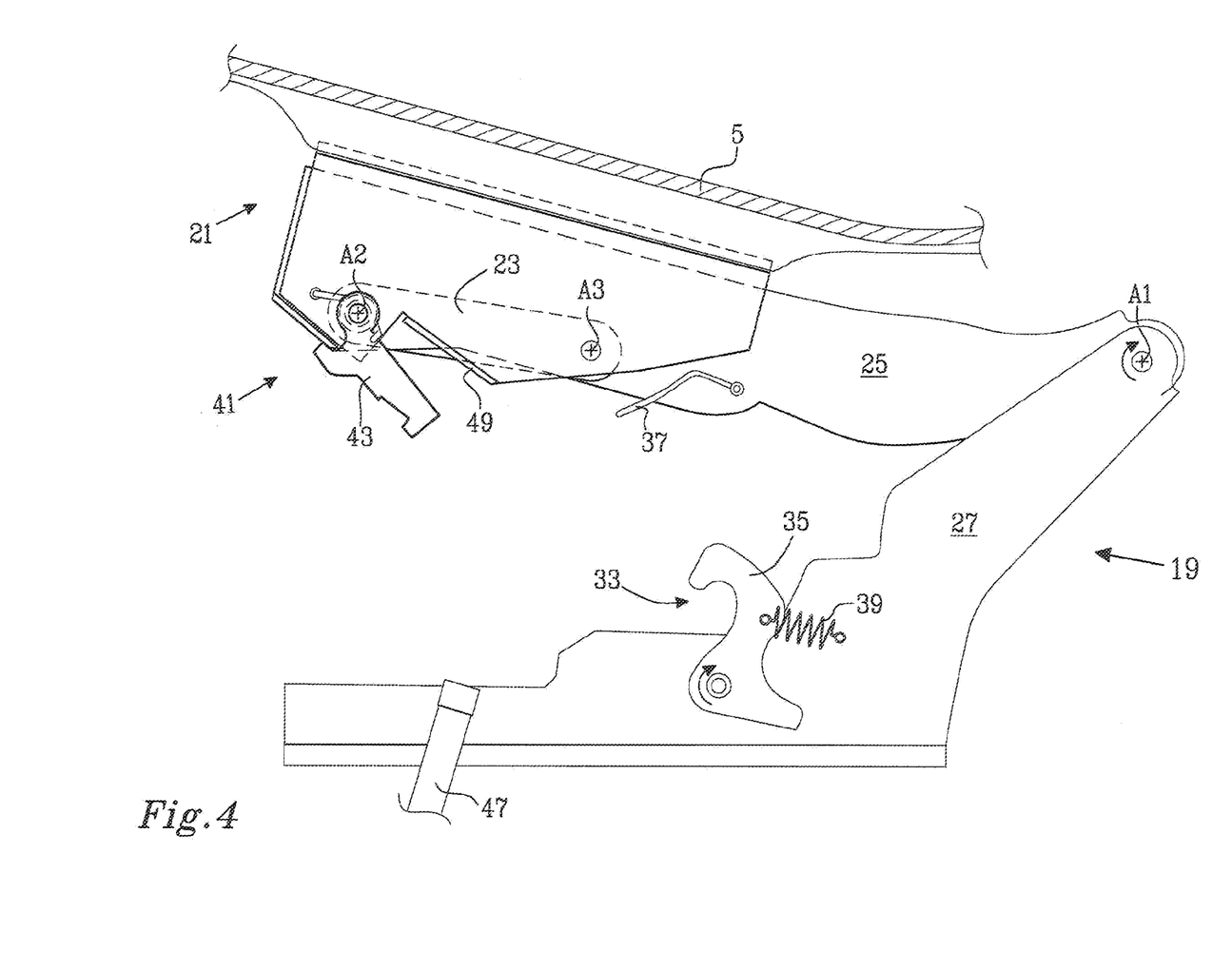
FIG. 4 illustrates the hinge arrangement of FIG. 2 during opening of the bonnet.

FIGS. 2-4 illustrate an embodiment of a hinge arrangement 11 according to the disclosure. The illustrated embodiment is the hinge arrangement 11 at the rear end portion 17 of the bonnet 5 of FIG. 1.

The hinge arrangement 11 comprises a hinge portion 19 adapted to be directly or indirectly attached to the body 13 of the vehicle 3, a bonnet portion 21 adapted to be directly or indirectly attached to the bonnet 5 and a rear deployment guiding element 23. The hinge arrangement 11 is transitable between a normal position, illustrated in FIG. 2, corresponding to the bonnet 5 being in the closed position, and a deployed position, illustrated in FIG. 3, corresponding to the bonnet 5 being in the deployed position. In the open position of the bonnet 5, illustrated in FIG. 4, the hinge arrangement 11 is also in its normal position.

The hinge portion 19 comprises one or more hinge pivot axes providing a hinged connection between the bonnet 5 and the body 13 of the vehicle 3 allowing normal opening of the bonnet 5 for maintenance, service and repair. In the illustrated embodiment, the hinge arrangement 11 comprises a single hinge pivot axis A1, but it would also be feasible with a multi-link hinged connection comprising a plurality of pivot axes. The hinge portion 19 comprises an upper portion 25 being more distal to the body 13 than the hinged connection, and a lower portion 27 being less distal, i.e., more proximal, to the body 13 than the hinged connection. In the illustrated embodiment, the upper portion 25 is pivotally connected to the lower portion 27 by the hinge pivot axis A1, such that the hinge pivot axis A1 provides the hinged connection. However, for a multi-link hinged connection, there may be other portions or elements, such as link arms, located between the lower portion 27 and the upper portion 25.

The rear deployment guiding element 23 is adapted to control the transition of the hinge arrangement 11 between the normal position and the deployed position. In the illustrated embodiment, the rear deployment guiding element 23 comprises an arm having a first end 29 pivotally connected at a second pivot axis A2 to the bonnet portion 21 and a second end 31 pivotally connected at a third pivot axis A3 to the upper portion 25 of the hinge portion 23.

The hinge portion 19 comprises a first locking unit 33, in the illustrated embodiment, comprising a hook 35 and a catch 37. The first locking unit 33 may assume a locked state, as is illustrated in FIGS. 2-3, or an open state, as is illustrated in FIG. 4. The hook 35 is tensioned, e.g., by a spring 39, such that it is biased to the locked state. In the locked state, the upper portion 25 is locked in relation to the lower portion 27 of the hinge arrangement 11, i.e., their positions in relation to each other are fixed. When the hinge arrangement 11 is transited to its deployed state, the first locking unit 33 will stay in its locked state, such that there is no pivotal movement at the hinged connection of the hinge arrangement 11 during displacement of the bonnet 5 to the deployed position. In the open state of the first locking unit 33, the spring 39 is tensioned, in the illustrated case by being compressed. The hook 35 is then movable away from the catch 37. The upper portion 25 is then displaceable in relation to the lower portion 27 by means of the hinged connection, thus allowing normal opening of the bonnet 5, as will be further described in conjunction with FIG. 4. Other tension arrangements for the hook 35 are feasible, e.g., a spring which is elongated when changing to the open state.

In the illustrated embodiment, the hook 35 is located at the lower portion 27 and the catch 37 at the upper portion 25, but they may also be located in the opposite way. Other kinds of first locking units are feasible, but not illustrated, such as a spring-loaded pin attached to one of the upper portion 25 or the lower portion 27 and going through an opening in the other of the upper portion 25 or the lower portion 27, which pin may be pulled out from the opening to assume the open state allowing pivotal movement at the hinged connection between the upper portion 25 and the lower portion 27.

The hinge arrangement 11 comprises a second locking unit 41, which may assume a locked state, as is illustrated in FIGS. 2 and 4, or an open state, as is illustrated in FIG. 3. In the locked state, the bonnet portion 21 is locked in relation to the upper portion 25 of the hinge portion 19. In the open state of the second locking unit 41, the bonnet portion 21 as a whole is allowed to move in relation to the upper portion 25 of the hinge portion 19. This movement is controlled by the rear deployment guiding element 23. In the illustrated embodiment, the second locking unit 41 comprises a hook 43 attached to the bonnet portion 21, which hook 43 is adapted to grip around a catch 45 of the upper portion 25 of the hinge portion 19. The hook 43 is attached to the bonnet portion 21 by the second pivot axis A2 and is pivotable around that axis A2, such that the hook 43 can be moved out of grip of the catch 45. The second locking unit 41 may be biased to its locked state, e.g., by the hook 43 being tensioned by a spring 44.

In order to be able to transit the hinge arrangement 11 to its deployed position, thereby also displacing the bonnet 5 to its deployed position, the hinge arrangement 11 comprises a lifting member 47, e.g., a piston, which may be released by pyrotechnics. The bonnet portion 21 comprises an abutment 49. When the lifting member 47 directly or indirectly acts on the abutment 49, the bonnet portion 21 is displaced upwards and rearwards in a displacement governed by the rear deployment guiding element 23. See FIG. 3.

When the lifting member 47 is released, e.g., when a sensor of the vehicle 3 has indicated at collision with a vulnerable road user or an imminent collision with a vulnerable road user, the lifting member 47 initially operates on the second locking unit 41, such that the second locking unit 41 is changed to its open state. In the illustrated embodiment, the lifting member 47 moves the hook 43 out of way of the catch 45 by pivoting the hook 43 around the second pivot axis A2. Thereafter the bonnet portion 21 is free to move as a whole in relation to the hinge portion 19, in particular in relation to the upper portion 25 of the hinge portion 19. The lifting member 47 then acts via the hook 43 on the abutment 49, thereby displacing the bonnet portion 21. As an alternative, the lifting member 47 may act directly on the bonnet portion 21.

The bonnet portion 21 is translationally displaced upwards and rearwards in relation to the hinge portion 19 in order to reach the deployed position. During the displacement, the bonnet portion 21 has no direct connection to the hinge portion 19. Instead they are indirectly connected via the rear deployment guiding element 23. The hinge portion 19 remains in its normal position, which is the position also corresponding to a closed bonnet 5. There is then no relative movement within the hinge portion 19. Hence the relative movement within the hinge arrangement 11 during the transition of the hinge arrangement 11 to the deployed position and the relative movement within the hinge arrangement 11 during normal opening of the bonnet 5 are decoupled from each other.

FIG. 3 illustrates the hinge arrangement 11 in its deployed state. In comparison to FIG. 2, the rear deployment guiding element 23 has pivoted around the second and third pivot axes A2, A3, such that the bonnet 5 assumes its deployed position. The first locking unit 33 remains in its locked state.

FIG. 4 illustrates the hinge arrangement 11 during normal opening of the bonnet 5. The bonnet 5 is opened by moving it in the hinged connection. In the illustrated embodiment, the upper portion 25 of the hinge portion 19 is pivoted relative to the lower portion 27 at the hinge pivot axis A1 providing the hinged connection. The bonnet portion 21 is meanwhile in a fixed position relative to the upper portion 25 of the hinge portion 19 during opening of the bonnet 5, since the bonnet portion 21 is locked by the second locking unit 41 being in its locked state. The bonnet portion 21 hence moves together with the upper portion 25 in the pivotal movement around the hinge pivot axis A1.

Figure 5:
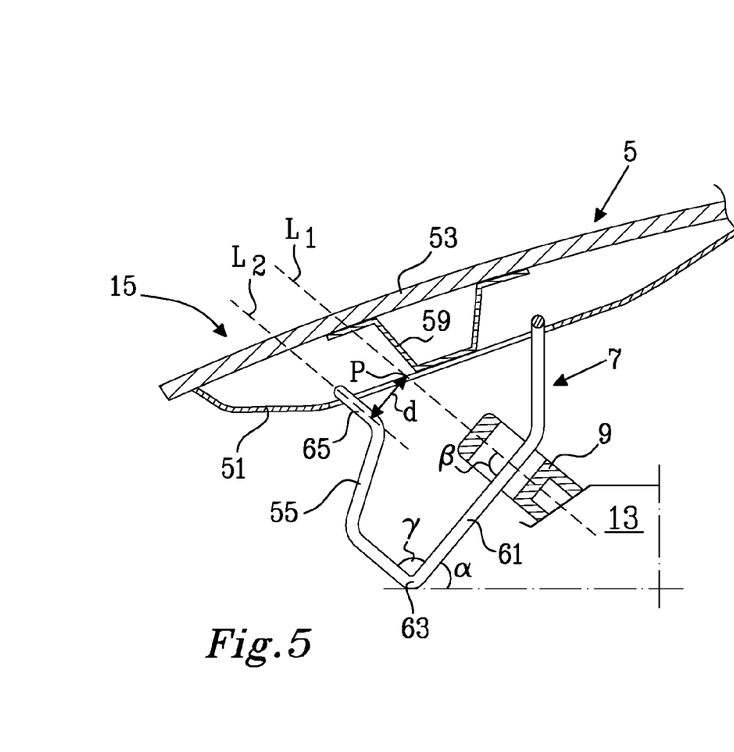
FIG. 5 illustrates a latch and a striker of the bonnet arrangement of FIG. 1 with the bonnet in a closed position.
Figure 6:
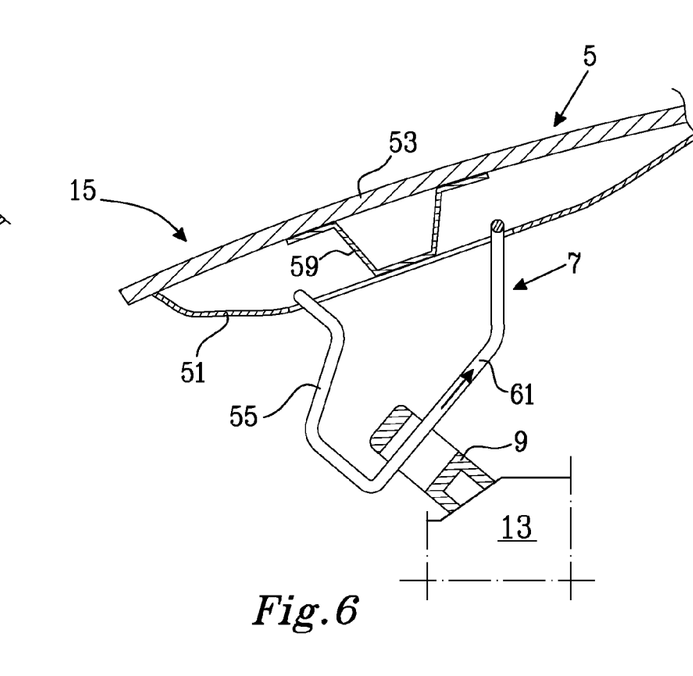
FIG. 6 illustrates the latch and striker of FIG. 5 with the bonnet in a deployed position.

FIGS. 5 and 6 illustrate a front portion of the bonnet arrangement 1 showing the front end portion 15 of the bonnet 5, the striker 7 and the latch 9. FIG. 5 illustrates the bonnet 5 being in the closed position and FIG. 6 illustrates the bonnet 5 being in the deployed position.

The bonnet 5 comprises an inner panel 51 and an outer panel 53. The striker 7 comprises a shaped rod 55, which together with a reinforcing structure 57 at the inner panel 51 of the bonnet 5 forms a closed circumference. An optional reinforcement 59 connects the inner panel 51 and the outer panel 53 at the location of the striker 7.

A portion of the shaped rod 55 forms a deployment guiding portion 61. The deployment guiding portion 61 forms a front deployment guiding element for guiding the front end portion 15 of the bonnet 5 during deployment of the bonnet 5. The deployment guiding portion 61, in the illustrated embodiment shown as a straight portion of the shaped rod 55, forms an angle α of from 20 to 70 degrees, preferably from 30 to 60 degrees, and most preferably from 40 to 50 degrees, to a horizontal plane of the vehicle 3, assuming the vehicle 3 also is on a horizontal plane. In the illustrated embodiment, the angle α is about 45 degrees. The angle α is selected such that the displacement at the front end portion 15 of the bonnet 5 corresponds to that of the rear end portion 17, where the lifting member 47 is located. Corresponding displacements result in that the bonnet 5 is moved as a whole, although the actual displacements, e.g., given in millimeters upwards and rearwards at the two end portions 15, 17 may differ, since the bonnet 5 may also be somewhat tilted.

The latch 9 is located such that it in a locked state encloses the deployment guiding portion 61. Preferably, the latch 9 is angled in relation to the horizontal plane of the vehicle 3, when seen from the lateral side of the vehicle 3, such that the latch 9 forms an angle β to the deployment guiding portion 61. The angle β is determined between a length direction L1 of the latch 9 and the deployment guiding portion 61. The length direction L1 of the latch 9 is independent from that of the vehicle 3 and depends on how the latch 9 is angled in relation to the vehicle 3. In the illustrated embodiment, the length direction L1 of the latch 9 in relation to the horizontal plane is given by a combination of the angles α and β. The angle β is in the range of 80-100 degrees, preferably in the range of 85-95 degrees, more preferably the angle β is substantially right or right, as is illustrated in FIG. 5.

In the locked state of the latch 9, a latch portion may go through the closed circumference of the striker 7 and retain the striker 7 in the latch 9. The latch portion may be moved to the side, e.g., rotated away, thereby setting the latch 9 in an unlocked state, in which the striker 7 is possible to move upwards, away from the latch 9, thereby making it possible to open the bonnet 5. Alternatively, two latch portions may be used, possibly achieved by rotating in opposite directions. As another alternative, the latch portion could be a retractable pin, which goes through the striker 7 when in a locked state, and which pin is refracted to set the latch 9 in the unlocked state. When the bonnet 5 is to be closed again, the bonnet 5 may be dropped from a position above the latch 9, such that the striker 7 passes the latch portion. Alternatively, the bonnet 5 may be pushed through the latch portion by applying a force, e.g., pressing it down by hand force.

The shaped rod 55 also comprises a lower corner 63 formed at a lower end of the deployment guiding portion 61, in which lower corner 63 the shaped rod 55 forms an angle γ, which angle γ is chosen such that the latch 9 is prevented from passing the lower corner 63. In the illustrated embodiment, the angle γ is about 90 degrees. In general, the angle γ is preferably in the range of 70-110 degrees, more preferably in the range of 85-95 degrees.

The striker 7 is further configured such that at least a portion of it is attached to the bonnet 5 in front of the latch 9 when the bonnet 5 is in its closed position. See FIG. 5. A front end portion 65 of the shaped rod 55 is attached to the bonnet 5 in front of the latch 9. The front end portion 65 has a length direction $L_2$. It is preferred that the length direction $L_1$ of the latch 9 and the length direction $L_2$ of the front end portion 65 are within 20 degrees from each other, preferably within 10 degrees from each other, and more preferably are substantially parallel or parallel.

As mentioned above, the front end portion 65 is attached to the bonnet 5 in front of the latch 9 when the bonnet 5 is in its closed position. Further the front end portion 65 is attached to the bonnet 5 in front of a point P, in which the length direction L1 of the latch 9 intersects with the bonnet 5. The shortest distance between the point P where the length direction L1 intersects with the bonnet 5 and the front end portion 65 is denoted by d and should preferably be positive, i.e., the front end portion 65 being in front of the point P, preferably d being in the range of 0<d≤100 mm, more preferably 10 mm≤d≤80 mm, and most preferably 20 mm≤d≤50 mm.

When the bonnet 5 is being displaced to its deployed position by the rear end portion 17 being deployed by the lifting member 47, the deployment guiding portion 61 slides through the latch 9, thereby allowing the front end portion 15 to be deployed, such that the bonnet 5 is deployed at both the front end portion 15 and the rear end portion 17. During the deployment of the bonnet 5, the striker 7 is displaced upwards and rearwards in relation to the latch 9, which is attached to the body 13 of the vehicle 3. The latch 9 is in its locked state during the deployment. FIG. 6 illustrates the front portion of the bonnet arrangement 1, when the bonnet 5 has reached its deployed state. The latch 9 is then adjacent to the lower corner 63 of the shaped rod 55.

As an alternative to a shaped rod 55, not illustrated, the striker may comprise a slot forming the front deployment guiding element, in which slot the latch may move. In that case the slot would be selected to extend at the angle α of from 20 to 70 degrees, preferably from 30 to 60 degrees, and most preferably from 40 to 50 degrees, in relation to the horizontal plane of the vehicle.

The front deployment guiding member, e.g., the deployment guiding portion 61, or the slot, may have a straight shape as is illustrated in FIGS. 5-6. As an alternative, the front deployment guiding element may have a curved shape. If the front deployment guiding member has a curved shape, the angle α is defined by a straight line going through the end positions of the latch 9 in relation to the front deployment guiding element, which end positions correspond to a closed bonnet, like the position in FIG. 5, and to a deployed bonnet, like the position in FIG. 6. In any case, the shape of the front deployment guiding element is preferably chosen to cooperate with the rear deployment guiding element 23, such that the bonnet 5 is displaced to the deployed position in an appropriate way as a whole.

Even if FIG. 1 illustrates a bonnet arrangement 1 comprising the hinge arrangement 11 of FIGS. 2-4 and the latch 9 and striker 7 of FIGS. 5-6, it is to be understood that the hinge arrangement 11 as disclosed herein may be used together with another latch and another striker as known from prior art. Further, the latch 9 and the striker 7 as disclosed herein, e.g., in conjunction with FIGS. 5-6, may be utilized with a hinge arrangement known from prior art.

As such, the present disclosure should not be considered as limited by the embodiments and figures described herein. Rather, the full scope of the disclosure should be determined by the appended claims, with reference to the description and drawings. Additionally, the features of various implementing embodiments may be combined to form further embodiments according to the disclosure.

What is claimed is:

1. A hinge arrangement adapted to be located at a rear end portion of a bonnet of a vehicle, the bonnet being displaceable between a closed position and a deployed position located at least upwards as compared to the closed position, and the hinge arrangement being transitable between a normal position, corresponding to the bonnet being in the closed position, and a deployed position, corresponding to the bonnet being in the deployed position, the hinge arrangement comprising:
    a hinge portion adapted to be attached, directly or indirectly, to a body of the vehicle, the hinge portion comprising one or more hinge pivot axes for providing a hinged connection between the bonnet and the body of the vehicle allowing opening of the bonnet, and the hinge portion comprising a lower portion and an upper portion being more distal to the body than the lower portion when the hinge portion is attached to the body;
    a bonnet portion adapted to be attached, directly or indirectly, to the bonnet, the bonnet portion being arrangeable in a fixed position relative to the upper portion of the hinge portion during opening of the bonnet, and the bonnet portion as a whole being arrangeable to be translationally displaced at least upwards in relation to the upper portion of the hinge portion during the transition of the hinge arrangement between the normal position and the deployed position, wherein the hinged connection is configured to be inactive during the transition; and
    a rear deployment guiding element adapted to control the transition of the hinge arrangement between the normal position and the deployed position.

2. The hinge arrangement according to claim 1 wherein the rear deployment guiding element is directly or indirectly connected to the bonnet portion and to the upper portion of the hinge portion.

3. The hinge arrangement according to claim 2 wherein the rear deployment guiding element comprises an arm having a first end pivotally connected to the bonnet portion and a second end pivotally connected to the upper portion.

4. The hinge arrangement according to claim 1 wherein the hinge portion comprises a first locking unit having a locked state and an open state and being adapted to lock the upper portion of the hinge portion in relation to the lower portion of the hinge portion, the lower portion being positionable more proximal to the body of the vehicle than the hinged connection,
    the first locking unit in the open state being configured to allow opening of the bonnet,
    the first locking unit in the locked state being configured to lock the upper portion of the hinge portion in relation to the lower portion of the hinge portion.

5. The hinge arrangement according to claim 1 further comprising a lifting member adapted to operate on the bonnet portion, to thereby provide the translational displacement at least upwards of the bonnet portion in relation to the upper portion of the hinge portion during the transition of the hinge arrangement between the normal position and the deployed position.

6. The hinge arrangement according to claim 1 comprising a locking unit having a locked state and an open state and being adapted to lock the bonnet portion in relation to the upper portion of the hinge portion,
    the locking unit in the locked state being configured to lock the bonnet portion in relation to the upper portion of the hinge portion,
    the locking unit in the open state being configured to allow the translational displacement at least upwards of the bonnet portion.

7. The hinge arrangement according to claim 6 further comprising a lifting member adapted to operate on the bonnet portion, to thereby provide the translational displacement at least upwards of the bonnet portion in relation to the upper portion of the hinge portion during the transition of the hinge arrangement between the normal position and the deployed position.

8. The hinge arrangement according to claim 7 wherein the lifting member is adapted to operate on the locking unit to change the locking unit from the locked state to the open state.

9. A bonnet arrangement for a vehicle, the bonnet arrangement comprising:
    a bonnet being displaceable between a closed position and a deployed position located at least upwards as compared to the closed position; and
    a hinge arrangement according to claim 1 attachable to the bonnet.

10. The bonnet arrangement according to claim 9 further comprising a striker and a latch, one of the striker or the latch being adapted to be attached at a front end portion of the bonnet, and the other of the striker or the latch being adapted to be attached to a body of the vehicle at a position permitting cooperation between the striker and the latch;
    wherein the striker comprises a front deployment guiding element adapted to guide the latch during the displacement of the bonnet from the closed position to the deployed position, such that the displacements at least upwards of the bonnet to its deployed position correspond at the front end portion and at the rear end portion of the bonnet.

11. The bonnet arrangement according to claim 10 wherein the striker comprises a shaped rod, a deployment guiding portion of the shaped rod forming the front deployment guiding element, and wherein the latch in a closed state is adapted to move along the deployment guiding portion.

12. The bonnet arrangement according to claim 11 wherein the deployment guiding portion forms an angle of from 20 to 70 degrees to a horizontal plane of the vehicle.

13. The bonnet arrangement according to claim 11 wherein the deployment guiding portion forms an angle of from 30 to 60 degrees to a horizontal plane of the vehicle.

14. The bonnet arrangement according to claim 11 wherein the deployment guiding portion forms an angle of from 40 to 50 degrees to a horizontal plane of the vehicle.

15. The bonnet arrangement according to claim 10 wherein the latch assumes an angle to the front deployment guiding element in the range of 80-100 degrees.

16. The bonnet arrangement according to claim 10 wherein the latch assumes an angle to the front deployment guiding element in the range of 85-95 degrees.

17. The bonnet arrangement according to claim 10 wherein the latch assumes a right angle, or a substantially right angle, to the front deployment guiding element.

18. The bonnet arrangement according to claim 10 wherein the latch has a first length direction, and a front end portion of the striker has a second length direction, the length directions being within 20 degrees from each other.

19. The bonnet arrangement according to claim 10 wherein the latch has a length direction, and the striker is attached to the bonnet in front of a point in which the length direction intersects with the bonnet when the bonnet is in the closed position.

20. The bonnet arrangement according to claim 10 wherein the bonnet comprises an inner panel, an outer panel and a reinforcement between the inner and outer panels at a location corresponding to a location at which the striker or latch is adapted to be attached at the front end portion of the bonnet.

21. A hinge arrangement adapted to be located at a rear end portion of a bonnet of a vehicle, the bonnet being displaceable between a closed position and a deployed position located at least upwards as compared to the closed position, and the hinge arrangement being transitable between a normal position, corresponding to the bonnet being in the closed position, and a deployed position, corresponding to the bonnet being in the deployed position, the hinge arrangement comprising:

a hinge portion adapted to be attached, directly or indirectly, to a body of the vehicle, the hinge portion comprising an upper portion and a lower portion connected together at a hinged connection that is configured to allow movement of the bonnet between the closed position and an open position;

a bonnet portion adapted to be attached, directly or indirectly, to the bonnet, the bonnet portion being arrangeable in a fixed position relative to the upper portion of the hinge portion during movement of the bonnet between the closed position and the open position, and the bonnet portion as a whole being arrangeable to be translationally displaced at least upwards in relation to the upper portion of the hinge portion during the transition of the hinge arrangement between the normal position and the deployed position, wherein the hinge portion is configured such that the upper portion remains fixed relative to the lower portion during the transition; and a deployment guiding element adapted to control the transition of the hinge arrangement between the normal position and the deployed position.

* * * * *